(12) United States Patent
Stolbikov et al.

(10) Patent No.: US 12,225,113 B2
(45) Date of Patent: Feb. 11, 2025

(54) END TO END FILE-SHARING SCHEMA USING SIGNED MERKLE TREE RANDOMLY ORIGINATED KEYS

(71) Applicant: Lenovo (Singapore) Pte. Ltd., Singapore (SG)

(72) Inventors: Igor Stolbikov, Apex, NC (US); Sergei Rodionov, Plano, TX (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 217 days.

(21) Appl. No.: 17/932,904

(22) Filed: Sep. 16, 2022

(65) Prior Publication Data
US 2024/0097886 A1   Mar. 21, 2024

(51) Int. Cl.
*H04L 9/08* (2006.01)
*H04L 9/06* (2006.01)
*H04L 9/32* (2006.01)

(52) U.S. Cl.
CPC .......... *H04L 9/0825* (2013.01); *H04L 9/0643* (2013.01); *H04L 9/0869* (2013.01); *H04L 9/3263* (2013.01)

(58) Field of Classification Search
CPC ... H04L 9/0825; H04L 9/0643; H04L 9/0869; H04L 9/3263; H04L 9/0631; H04L 9/0637; H04L 9/0833; H04L 9/50
See application file for complete search history.

(56) References Cited

U.S. PATENT DOCUMENTS

| | | | | |
|---|---|---|---|---|
| 6,886,095 | B1 * | 4/2005 | Hind | H04W 12/50 713/168 |
| 7,395,436 | B1 * | 7/2008 | Nemovicher | H04L 63/0823 726/28 |
| 8,789,753 | B1 * | 7/2014 | de Jong | G06K 19/07716 235/382 |
| 8,843,750 | B1 * | 9/2014 | Sokolov | H04L 63/0823 713/175 |
| 2019/0020632 | A1 * | 1/2019 | Leavy | H04L 9/14 |
| 2021/0303170 | A1 * | 9/2021 | Lin | G06F 3/0647 |

* cited by examiner

*Primary Examiner* — Maung T Lwin
*Assistant Examiner* — Suman Debnath
(74) *Attorney, Agent, or Firm* — Schwegman Lundberg & Woessner, P.A.

(57) ABSTRACT

A process for transmitting a file from a sender device to a receiver device includes generating a random symmetric session key for the sender device, and randomly selecting a private ephemeral key for the sender device. The private ephemeral key is associated with a corresponding first public key. A public ephemeral key is randomly selected for the receiving device. The public ephemeral key is associated with a corresponding first private key. A random value is generated, an encrypted session key is calculated, and the file is encrypted using symmetric encryption. The sender device includes a first public X509 certificate comprising a second public key and a corresponding second private key that is signed by a service provider, and the receiver device includes a second public X509 certificate comprising a third public key and a corresponding third private key.

17 Claims, 7 Drawing Sheets

END TO END FILE-SHARING SCHEMA USING SIGNED MERKLE TREE RANDOMLY ORIGINATED KEYS

TECHNICAL FIELD

Embodiments described herein generally relate to file sharing schemas using signed Merkle tree randomly originated keys.

BACKGROUND

There are significant challenges related to user trust and protection of customer data faced by industry. Specifically, when file sharing is implemented in the cloud, cloud providers face challenges of the trust that their customers' highly sensitive data will not be leaked or compromised. This puts a significant burden on the cloud provider to constantly prove that the confidentiality of the customer data cannot be breached.

Such cloud providers struggle to prove that data are fully secure, and that even the cloud provider or its direct customer cannot access it. In some instances, for consumer and enterprise solutions, the cloud provider or direct customer is required to create a file-sharing zero-knowledge schema that ensures safety and integrity of a user's data while the data are transferred over intermediate cloud-based data storage.

There are a number of end-to-end encryption (E2EE) schemas including those used for instant messaging apps. Solutions primarily target one-to-one communications and do not target group file sharing. The best known E2EE protocol is the Signal protocol widely used by a number of companies. However, the Signal protocol has significant issues with privacy and only protects the content of the files.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

To address the issue of trust and protection of user data, in an embodiment, an end-to-end encryption schema is used to ensure that potential eavesdroppers will not be able to access keys to decrypt and potentially affect data that are transmitted. The embodiment supports both one-to-one (direct transfer) and one-to-many (global clipboard) scenarios, and it allows for flexibility in use.

Additionally, one or more embodiments possess several features. For example, the system is able to authenticate the devices or users in order to identify the source of the request. Message authentication can also be referred to as data-origin authentication. Authentication protects the integrity of a message or file so as to ensure that each message/file which is received is in the same condition as when it was sent out, with no modifications to the message or file.

The system also possesses the attribute of forward secrecy. Forward secrecy relates to the situation when a long-term key is compromised. In such a situation, any session keys that were previously established using that long-term key should not be compromised. A typical example of protocols that provide forward secrecy is key agreement protocols where the long-term key is only used to authenticate the exchange. Key transport protocols in which the long-term key is used to encrypt the session key cannot provide forward secrecy. Similarly, the system should possess backward secrecy or future secrecy capabilities. This is when a protocol can guarantee that a compromise of a long-term key does not allow subsequent ciphertexts to be decrypted by passive adversaries.

The system provides confidentiality. Confidentiality ensures that the necessary level of secrecy is enforced at each junction of data processing and prevents unauthorized disclosure. This is usually achieved by encrypting the data from the sender to the receiver, and only those with the correct decryption key can read what the encrypted data contain. In an embodiment, only user owned devices should be able to decrypt files.

Integrity, another feature, relates to the assurance that anyone throughout the transmission does not modify the content of a file. Any honest party should not under any circumstances accept a message that is modified. Hardware, software, and communication mechanisms act together in concert to maintain and process data correctly and to move data to intended destinations without unexpected alteration. The systems and network should be protected from outside interference and contamination.

Privacy and anonymity information should be protected, such that any anonymity features provided by the protocol are not undermined. The transport should provide anonymity and should not deanonymize users by allowing the linking key identities. Finally, files should be sharable by a group of devices or users with explicit permissions assigned.

Before discussing one or more embodiments in detail, it is noted that these embodiments employ certain known algorithms. The Double Ratchet Algorithm (previously referred to as the Axolotl Ratchet) is a key management algorithm. A Merkle Tree or hash tree is also used. In a Merkle tree, every "leaf" (node) is labeled with the cryptographic hash of a data block, and every node that is not a leaf (called a branch, inner node, or inode) is labeled with the cryptographic hash of the labels of its child nodes. A hash tree allows efficient and secure verification of the contents of a large data structure. A hash tree is a generalization of a hash list and a hash chain. An embodiment also uses elliptic curve cryptography (ECC), which is a public-key cryptographic system based on how elliptic curves are structured algebraically over finite fields. The embodiment uses multiple advanced properties of ECC including ECC point multiplication to scalar, and points addition and subtraction.

Figure 1:
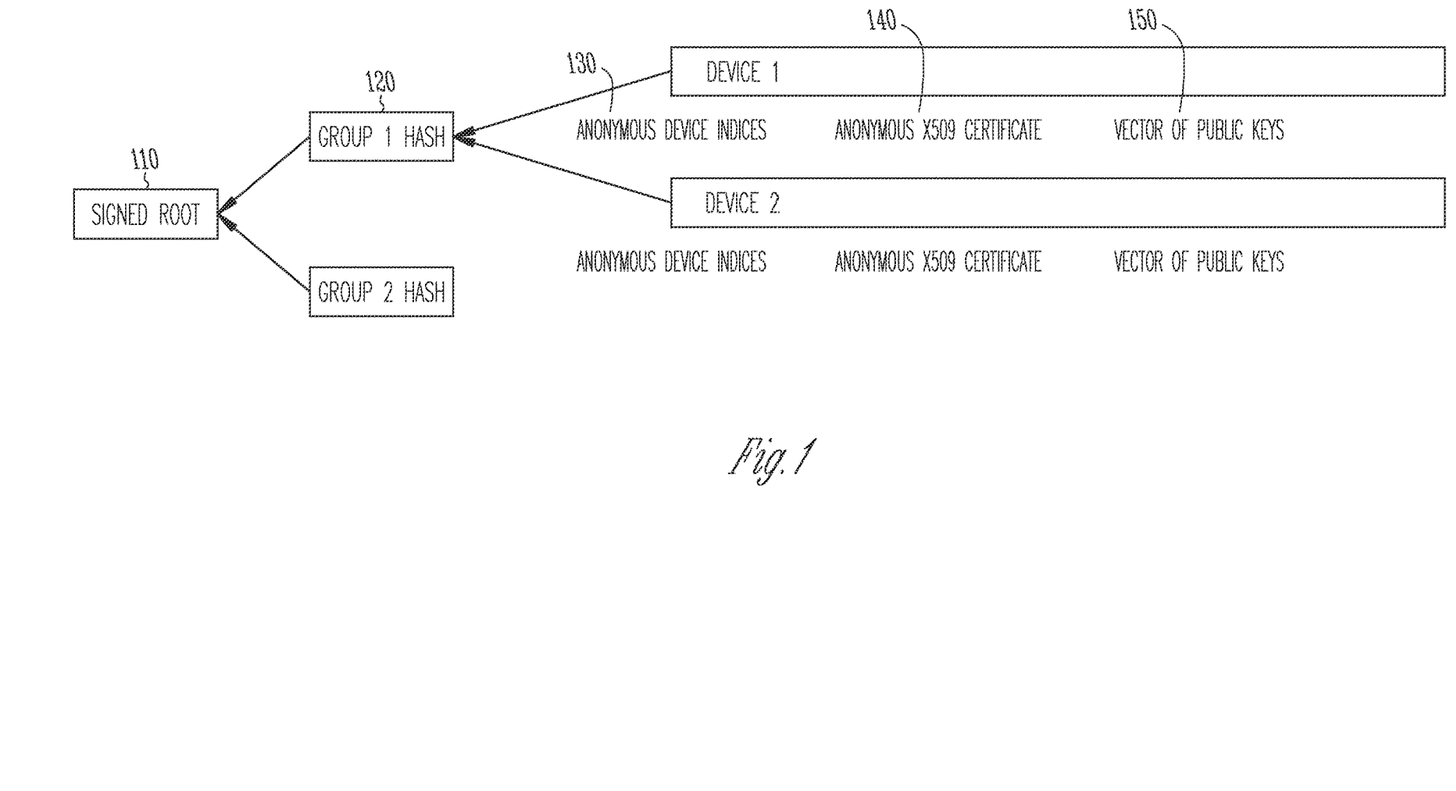
FIG. 1 is an example of a portion of a modified signed Merkle tree.

Now specifically, referring to FIG. 1, which is an example of a portion of a modified signed Merkle tree, the E2EE file encryption schema is used in an embodiment for device group file sharing that uses a modified version of the Signed Merkle Tree. As noted above, the schema is based on the Elliptic Curve Private/Public Key Cryptography and uses ECC points multiplications and additions. The vector 150 of the one-time public key, along with the anonymous device indices 130, allows access and selection of the key. Devices select keys randomly, thereby making the selection not predictable for a bad actor. In an embodiment, there is a pool of keys (FIG. 2, No. 220) that is large enough to make a selection of the same key an extremely rare event. Additionally, keys can be removed from further usage after being selected. The pool is replenished after all keys are spent. Each device in the group has an anonymous X509 certificate 140 associated with it, and a hash 120 is created for that group of devices. The group hash 120 is then stored in the root 110 of the signed Merkle tree.

Figure 2:
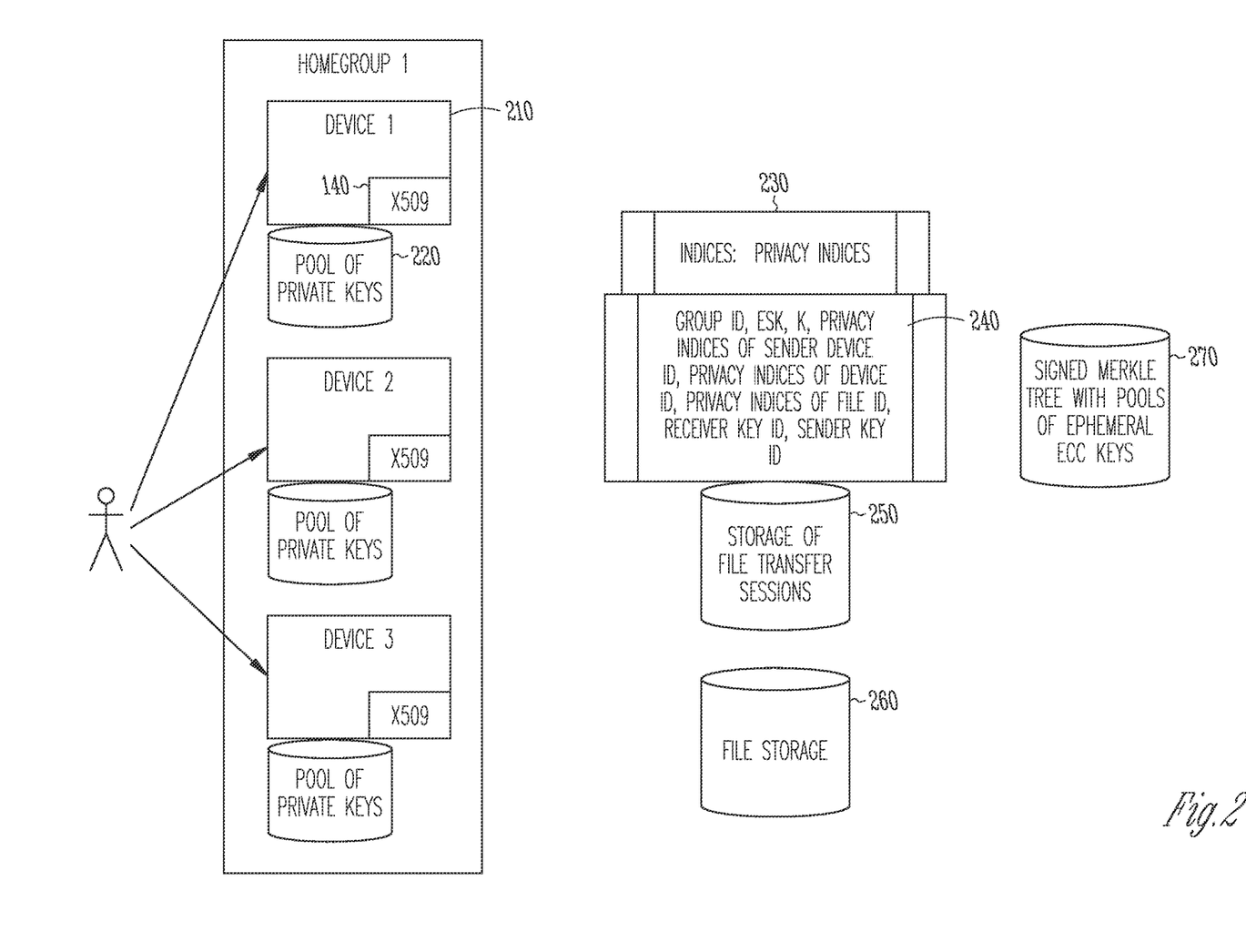
FIG. 2 is an example of a use scenario of an embodiment of the present disclosure.

FIG. 2 illustrates a possible use scenario for a group of sending devices 210. In an embodiment, the sending device 210 generates a random symmetric session key s. The random symmetric session key should be matched to the American Encryption Standard 256 bits. Private ephemeral keys e(j) of the sender device are then selected from a pool of private keys 220. One ephemeral key per device is selected. The associated public key can be referred to as ED(j). Receiver public ephemeral keys d(i) of the destination devices are selected. Like with the sending devices, one ephemeral key per destination device is selected. The corresponding private key can be referred to as private key RD(i). The sending device has a device public X509 certificate 140 with a public key E and corresponding private key e, which is signed by a service provider. The retrieving device similarly has a device public X509 certificate with public key R and private key r. A random value k within range of n is generated.

With this framework, the following calculations are made. First, an encrypted session key is calculated as follows:

$$\text{Encrypted Session Key as } ESK = (s + k*RD(i)*ED(j) + k*E*R)/(\text{mod } n)$$

A Group ID, the ESK, the random value k, a sender device ID, a receiver device ID, a hashed file ID, a receiver key ID, and a sender Key ID (240) is transmitted from the sender device to the receiver device (240). In connection with any such transmission a record 250 is created for the receiving device, and this record includes the same random value k, the same sender device ID, the same hashed file ID, and the same Group ID. The system can also include additional file storage 260.

The files to be transmitted from the sender device to the receiver device are encrypted using symmetric encryption, for example using AES-GSM with a key derived from the symmetric session key as follows:

Chain Key initialized with Session Key as chainKey=HMAC_SHA256 (Session Key, device ID)
File encryption Key=KDF (chainKey // file Name)
KDF is the key derivation function in cryptography.
Encrypt file with AES-GCM
chainKey=HMAC_SHA256 (Encryption Key, device ID)

The decryption process at the receiver device is the reverse. The receiver device retrieves the encrypted file with the information including ESK, the random value k, the sender device ID, the receiver Key ID, and the sender Key ID.

Figure 3:
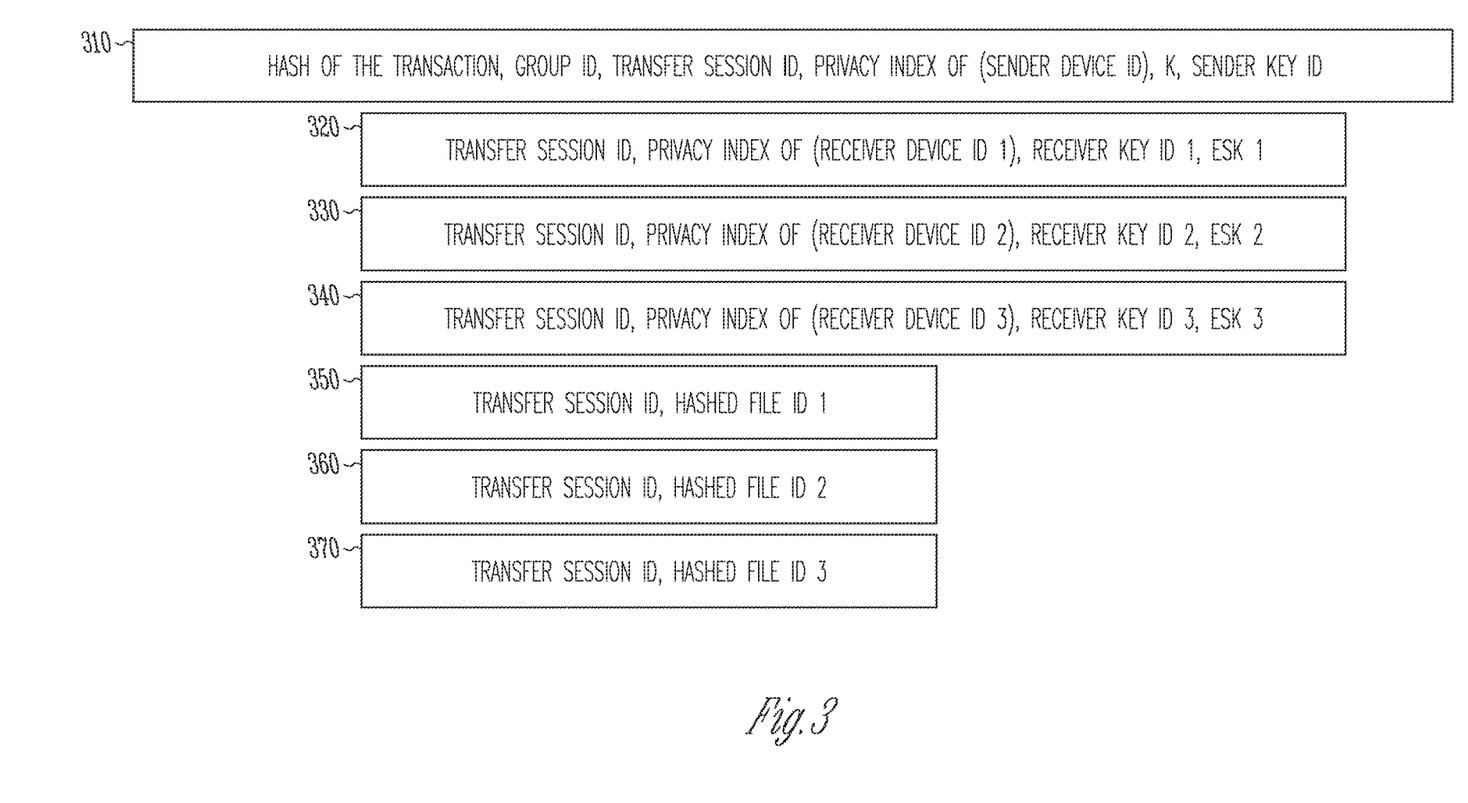
FIG. 3 is an example embodiment of a signed Merkle tree structure.

The random symmetric session key s is calculated as
Session Key $s = ESK - (k*ED(j)*d(i) + k*E*r)/(\text{mod } n)$ The data in the transmitted files are stored in the signed Merkle tree structure 270 with each element defined as illustrated in FIG. 3. Specifically, the Merkle tree structure includes in a record 310 the hash of the transaction, the Group ID, a transfer session ID, a privacy index of the sender device ID, the random number k, and a sender key ID. As noted above, encrypted session keys (ESK) are calculated. In the example structure of FIG. 3, a first ESK1, a second ESK2 and a third ESK3 are stored in records 320, 330 and 340 along with the transfer session ID, a privacy index for each of the three receiver devices of this example, and the three receiver key IDs of this example. The records 350, 360 and 370 each include a transfer session id, and the hashed file ids for the respective files.

Figure 4A:
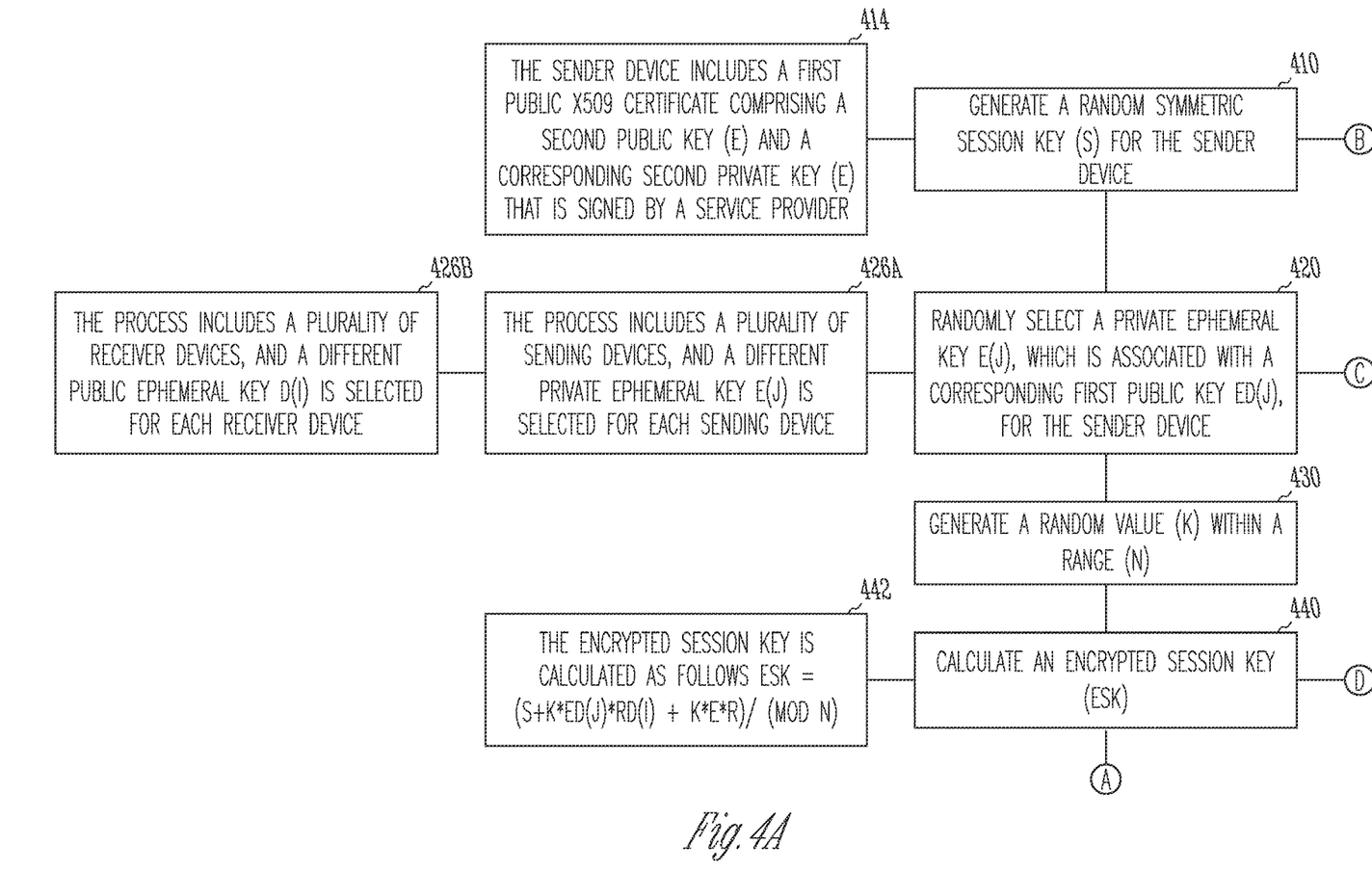
FIGS. 4A, 4B and 4C are a block diagram illustrating operations and features of a filing sharing schema using signed Merkle tree randomly originated keys.
Figure 4B:
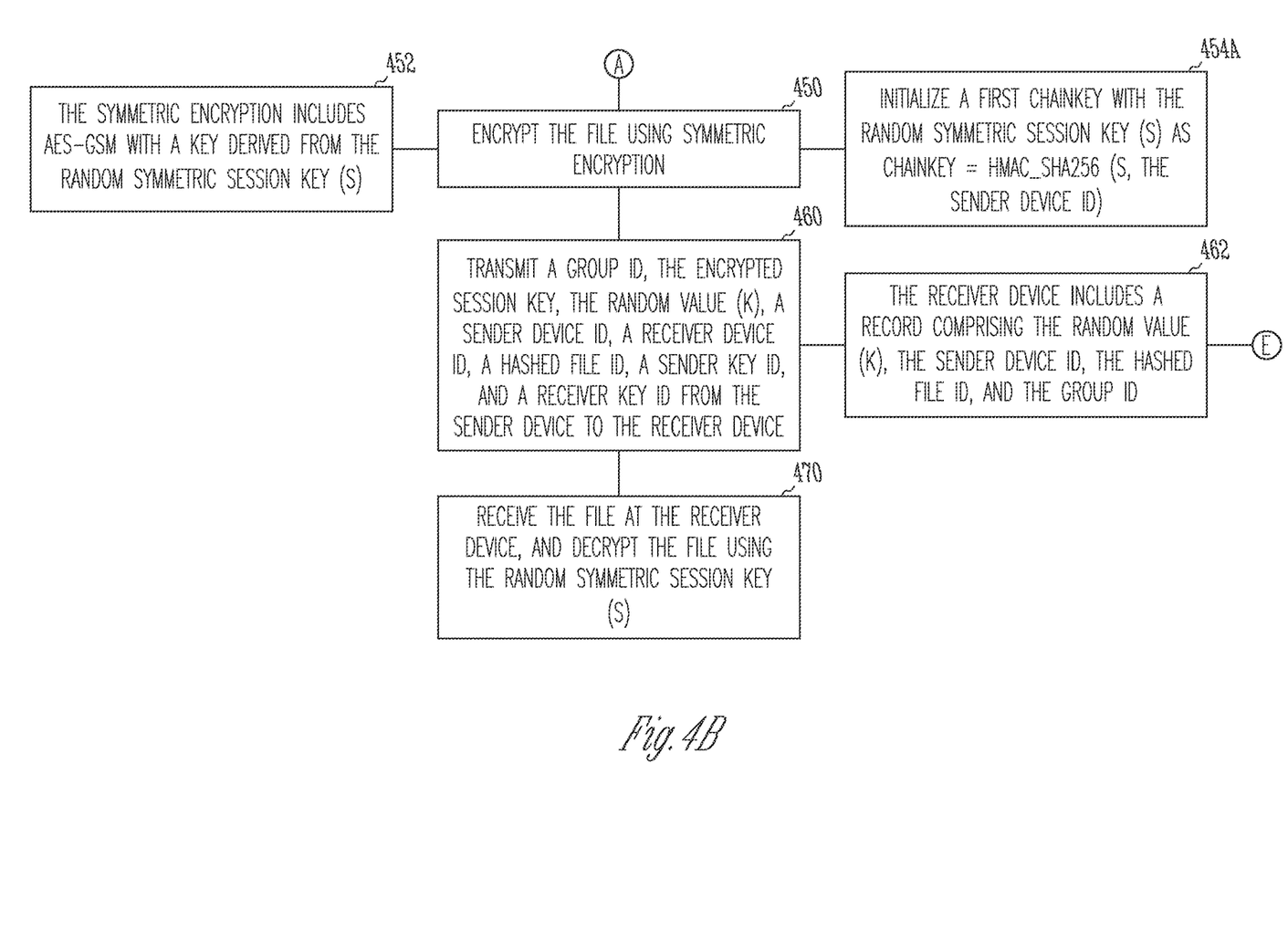
Figure 4C:
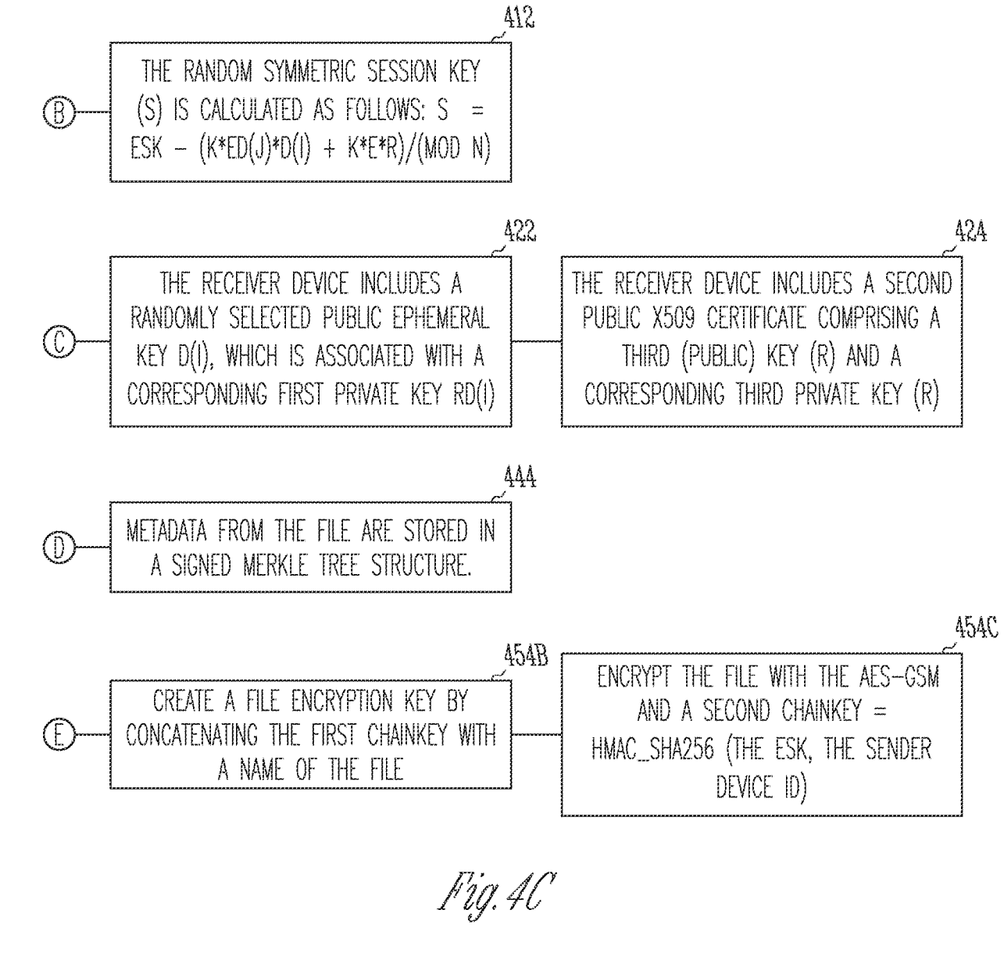

FIGS. 4A, 4B and 4C are a block diagram illustrating operations and features of a filing sharing schema using signed Merkle tree randomly originated keys. FIGS. 4A, 4B and 4C include a number of process and feature blocks 410-470. Though arranged substantially serially in the example of FIGS. 4A, 4B and 4C, other examples may reorder the blocks, omit one or more blocks, and/or execute two or more blocks in parallel using multiple processors or a single processor organized as two or more virtual machines or sub-processors.

Referring now specifically to FIGS. 4A, 4B and 4C, at 410 a process for transmitting a file from a sender device to a receiver device generates a random symmetric session key (s) for the sender device. As indicated at 412, in an embodiment, the random symmetric session key (s) is calculated as follows:

$$s = ESK - (k*ED(j)*d(i) + k*E*r)/(\text{mod } n).$$

As indicated at 414, the sender device includes a first public X509 certificate comprising a second public key (E) and a corresponding second private key (e) that is signed by a service provider. As indicated at 416, the random symmetric session key (s) includes an Advanced Encryption Standard (AES) key comprising 256 bits.

At 420, a private ephemeral key e(j) is randomly selected for the sender device. The private ephemeral key is associated with a corresponding first public key ED(j). As indicated at 422, the receiver device includes a randomly selected public ephemeral key d(i). The randomly selected public ephemeral key is associated with a corresponding first private key RD(i). And as indicated at 424, the receiver device includes a second public X509 certificate comprising a third (public) key (R) and a corresponding third private key (r). As indicated at 426A, the process includes a plurality of sending devices, and a different private ephemeral key e(j) is selected for each sending device, and as indicated at 426B, the process includes a plurality of receiver devices, and a different public ephemeral key d(i) is selected for each receiver device.

At 430, a random value (k) within a range (n) is generated. At 440 an encrypted session key (ESK) is calculated. As indicated at 442, the encrypted session key is calculated as follows:

$$ESK = (s + k*ED(j)*RD(i) + k*E*R)/(\text{mod } n).$$

As indicated at 444, metadata from the file are stored in a signed Merkle Tree structure.

At 450, the file is encrypted using symmetric encryption. At 452, the symmetric encryption includes AES-GSM with a key derived from the random symmetric session key (s). Beginning at 454A, a first chainkey is initialized with the random symmetric session key (s) as chainkey=HMAC_SHA256 (s, the sender device ID). As in known to those of skill in the art, HMAC is a specific type of message authentication code (MAC) involving a cryptographic hash function and a secret cryptographic key. As with any MAC, it may be used to simultaneously verify both the data integrity and authenticity of a message. At 454B, a file encryption key is created by concatenating the first chainkey with a name of the file. At 454C, the file is encrypted with the AES-GSM and a second chainkey=HMAC_SHA256 (the ESK, the sender device ID).

At 460, a group ID, the encrypted session key, the random value (k), a sender device ID, a receiver device ID, a hashed file ID, a sender key ID, and a receiver key ID are transmitted from the sender device to the receiver device. As indicated at 462, the receiver device includes a record comprising the random value (k), the sender device ID, the hashed file ID, and the group ID. At 470, the filed is received at the receiver device, and the file is decrypted using the random symmetric session key (s).

Figure 5:
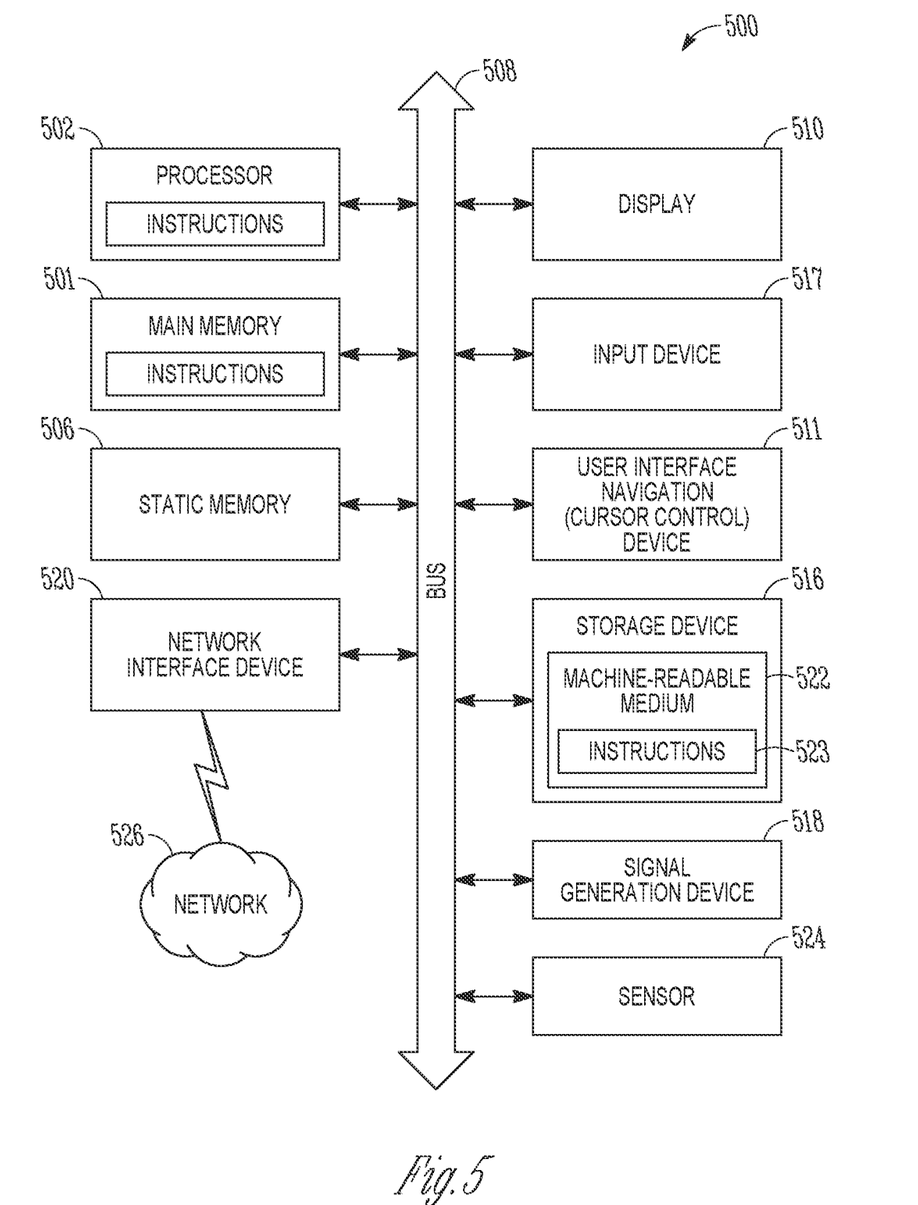
FIG. 5 is a block diagram of a computer architecture that can be used in one or more embodiments of the current disclosure.

FIG. 5 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (e.g., a central processing unit (CPU), a graphics processing unit (GPU) or both), a main memory 501 and a static memory 506, which communicate with each other via a bus 508. The computer system 500 may further include a display unit 510, an alphanumeric input device 517 (e.g., a keyboard), and a user interface (UI) navigation device 511 (e.g., a mouse). In one embodiment, the display, input device and cursor control device are a touch screen display. The computer system 500 may additionally include a storage device 516 (e.g., drive unit), a signal generation device 518 (e.g., a speaker), a network interface device 520, and one or more sensors 524, such as a global positioning system sensor, compass, accelerometer, or other sensor.

The storage device 516 includes a machine-readable medium 522 on which is stored one or more sets of instructions and data structures (e.g., software 523) embodying or utilized by any one or more of the methodologies or functions described herein. The software 523 may also reside, completely or at least partially, within the main memory 501 and/or within the processor 502 during execution thereof by the computer system 500, the main memory 501 and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 523 may further be transmitted or received over a communications network 526 using a transmission medium via the network interface device 520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 is a process for transmitting a file from a sender device to a receiver device comprising generating a random symmetric session key (s) for the sender device; randomly selecting a private ephemeral key e(j) for the sender device, the private ephemeral key associated with a corresponding first public key ED(j); wherein the receiver device comprises a randomly selected public ephemeral key d(i), the public ephemeral key associated with a corresponding first private key RD(i); generating a random value (k) within a range (n); calculating an encrypted session key (ESK); encrypting the file using symmetric encryption; and transmitting from the sender device to the receiver device a group ID, the encrypted session key, the random value (k), a sender device ID, a receiver device ID, a hashed file ID, a sender key ID, and a receiver key ID, wherein the receiver device includes a record comprising the random value (k), the sender device ID, the hashed file ID, and the group ID; wherein the sender device comprises a first public X509 certificate comprising a second (public) key (E) and a corresponding second private key (e) that is signed by a service provider; and wherein the receiver device comprises a second public X509 certificate comprising a third (public) key (R) and a corresponding third private key (r).

Example No. 2 includes all the features of Example No. 1, and optionally includes receiving the file at the receiver device, and decrypting the file using the random symmetric session key (s).

Example No. 3 includes all the features of Example Nos. 1-2, and optionally includes a process wherein the random symmetric session key (s) is calculated as follows:

$s=ESK-(k*ED(j)*d(i)+k*E*r)/(\mod n)$.

Example No. 4 includes all the features of Example Nos. 1-3, and optionally includes a process wherein the encrypted session key is calculated as follows:

$ESK=(s+k*ED(j)*RD(i)+k*E*R)/(\mod n)$.

Example No. 5 includes all the features of Example Nos. 1-4, and optionally includes a process including storing metadata from the file in a signed Merkle Tree structure.

Example No. 6 includes all the features of Example Nos. 1-5, and optionally includes a process wherein the random symmetric session key (s) comprises an Advanced Encryption Standard (AES) key comprising 256 bits.

Example No. 7 includes all the features of Example Nos. 1-6, and optionally includes a process wherein the symmetric encryption comprises AES-GSM with a key derived from the random symmetric session key (s).

Example No. 8 includes all the features of Example Nos. 1-7, and optionally includes a process including initializing a first chainkey with the random symmetric session key (s) as chainkey=HMAC_SHA256 (s, the sender device ID); creating a file encryption key by concatenating the first chainkey with a name of the file; and encrypting the file with the AES-GSM and a second chainkey=HMAC_SHA256 (the ESK, the sender device ID).

Example No. 9 includes all the features of Example Nos. 1-8, and optionally includes a process wherein the process comprises a plurality of sending devices, and a different private ephemeral key e(j) is selected for each sending device.

Example No. 10 includes all the features of Example Nos. 1-9, and optionally includes a process wherein the process comprises a plurality of receiver devices, and a different public ephemeral key d(i) is selected for each receiver device.

Example No. 11 is a machine-readable medium comprising instructions that when executed by a processor execute a process for transmitting a file from a sender device to a receiver device comprising: generating a random symmetric session key (s) for the sender device; randomly selecting a private ephemeral key e(j) for the sender device, the private ephemeral key associated with a corresponding first public key ED(j); wherein the receiver device comprises a randomly selected public ephemeral key d(i), the public ephemeral key associated with a corresponding first private key RD(i); generating a random value (k) within a range (n); calculating an encrypted session key (ESK); encrypting the file using symmetric encryption; and transmitting from the sender device to the receiver device a group ID, the encrypted session key, the random value (k), a sender device ID, a receiver device ID, a hashed file ID, a sender key ID, and a receiver key ID, wherein the receiver device includes a record comprising the random value (k), the sender device ID, the hashed file ID, and the group ID; wherein the sender device comprises a first public X509 certificate comprising a second (public) key (E) and a corresponding second private key (e) that is signed by a service provider; and wherein the receiver device comprises a second public X509 certificate comprising a third (public) key (R) and a corresponding third private key (r).

Example No. 12 includes all the features of Example No. 11, and optionally includes instructions for receiving the file at the receiver device, and decrypting the file using the random symmetric session key (s).

Example No. 13 includes all the features of Example Nos. 11-12, and optionally includes a machine-readable medium wherein the random symmetric session key (s) is calculated as follows:

$s=ESK-(k*ED(j)*d(i)+k*E*r)/(\mod n)$.

Example No. 14 includes all the features of Example Nos. 11-13, and optionally includes a machine-readable medium wherein the encrypted session key is calculated as follows:

$ESK=(s+k*ED(j)*RD(i)+k*E*R)/(\mod n)$.

Example No. 15 includes all the features of Example Nos. 11-14, and optionally includes a machine-readable medium including instructions for storing metadata from the file in a signed Merkle Tree structure.

Example No. 16 includes all the features of Example Nos. 11-15, and optionally includes a machine-readable medium wherein the random symmetric session key (s) comprises an Advanced Encryption Standard (AES) key comprising 256 bits.

Example No. 17 includes all the features of Example Nos. 11-16, and optionally includes a machine-readable medium wherein the symmetric encryption comprises AES-GSM with a key derived from the random symmetric session key (s).

Example No. 18 includes all the features of Example Nos. 11-17, and optionally includes a machine-readable medium including instructions for: initializing a first chainkey with the random symmetric session key (s) as chainkey=HMAC_SHA256 (s, the sender device ID); creating a file encryption key by concatenating the first chainkey with a name of the file; and encrypting the file with the AES-GSM and a second chainkey=HMAC_SHA256 (the ESK, the sender device ID).

Example No. 19 includes all the features of Example Nos. 11-18, and optionally includes a machine-readable medium wherein the process comprises a plurality of sending devices, and a different private ephemeral key e(j) is selected for each sending device; and wherein the process comprises a plurality of receiver devices, and a different public ephemeral key d(i) is selected for each receiver device.

Example No. 20 is a system including a computer processor; and a computer memory coupled to the computer processor; wherein the computer processor and the computer memory are operable for: generating a random symmetric session key (s) for the sender device; randomly selecting a private ephemeral key e(j) for the sender device, the private ephemeral key associated with a corresponding first public key ED(j); wherein the receiver device comprises a randomly selected public ephemeral key d(i), the public ephemeral key associated with a corresponding first private key RD(i); generating a random value (k) within a range (n); calculating an encrypted session key (ESK); encrypting the file using symmetric encryption; and transmitting from the sender device to the receiver device a group ID, the encrypted session key, the random value (k), a sender device ID, a receiver device ID, a hashed file ID, a sender key ID, and a receiver key ID, wherein the receiver device includes a record comprising the random value (k), the sender device ID, the hashed file ID, and the group ID; wherein the sender device comprises a first public X509 certificate comprising a second (public) key (E) and a corresponding second private key (e) that is signed by a service provider; and wherein the receiver device comprises a second public X509 certificate comprising a third (public) key (R) and a corresponding third private key (r).

The invention claimed is:

1. A process for transmitting a file from a sender device to a receiver device comprising:
   generating a random symmetric session key for the sender device;
   randomly selecting a private ephemeral key for the sender device, the private ephemeral key associated with a corresponding first public key;
   wherein the receiver device comprises a randomly selected public ephemeral key, the public ephemeral key associated with a corresponding first private key;
   generating a random value within a range;
   calculating an encrypted session key;
   encrypting the file using symmetric encryption; and
   transmitting from the sender device to the receiver device a group ID, the encrypted session key, the random value, a sender device ID, a receiver device ID, a hashed file ID, a sender key ID, and a receiver key ID, wherein the receiver device includes a record comprising the random value, the sender device ID, the hashed file ID, and the group ID;
   wherein the sender device comprises a first public X509 certificate comprising a second public key and a corresponding second private key that is signed by a service provider;
   wherein the receiver device comprises a second public X509 certificate comprising a third public key and a corresponding third private key; and
   wherein the encrypted session key is calculated as follows:
   encrypted session key=(the random symmetric session key+the random value*the first public key*the first private key+the random value*the second public key*the third public key)/(mod(the range)).

2. The process of claim 1, comprising receiving the file at the receiver device, and decrypting the file using the random symmetric session key.

3. The process of claim 2, wherein the random symmetric session key is calculated as follows:
   random symmetric session key=the encrypted session key−(the random value*the first public key*the public ephemeral key+the random value*the second public key*the third private key)/(mod(the range)).

4. The process of claim 1, comprising storing metadata from the file in a signed Merkle Tree structure.

5. The process of claim 1, wherein the random symmetric session key comprises an Advanced Encryption Standard (AES) key comprising 256 bits.

6. The process of claim 1, wherein the symmetric encryption comprises AES-GSM with a key derived from the random symmetric session key.

7. The process of claim 6, comprising:
   initializing a first chainkey with the random symmetric session key as chainkey=HMAC_SHA256 (the random symmetric session key, the sender device ID);
   creating a file encryption key by concatenating the first chainkey with a name of the file; and
   encrypting the file with the AES-GSM and a second chainkey=HMAC_SHA256 (the encrypted session key, the sender device ID).

8. The process of claim 1, wherein the process comprises a plurality of sending devices, and a different private ephemeral key is selected for each sending device.

9. The process of claim 1, wherein the process comprises a plurality of receiver devices, and a different public ephemeral key is selected for each receiver device.

10. A non-transitory machine-readable medium comprising instructions that when executed by a processor execute a process for transmitting a file from a sender device to a receiver device comprising:
    generating a random symmetric session key for the sender device;
    randomly selecting a private ephemeral key for the sender device, the private ephemeral key associated with a corresponding first public key;
    wherein the receiver device comprises a randomly selected public ephemeral key, the public ephemeral key associated with a corresponding first private key;
    generating a random value within a range;
    calculating an encrypted session key;
    encrypting the file using symmetric encryption; and
    transmitting from the sender device to the receiver device a group ID, the encrypted session key, the random value, a sender device ID, a receiver device ID, a hashed file ID, a sender key ID, and a receiver key ID, wherein the receiver device includes a record comprising the random value, the sender device ID, the hashed file ID, and the group ID;

wherein the sender device comprises a first public X509 certificate comprising a second public key and a corresponding second private key that is signed by a service provider;

wherein the receiver device comprises a second public X509 certificate comprising a third public key and a corresponding third private key, wherein the symmetric encryption comprises AES-GSM with a key derived from the random symmetric session key; and comprising instructions for:

initializing a first chainkey with the random symmetric session key as chainkey=HMAC_SHA256 (the random symmetric session key, the sender device ID);

creating a file encryption key by concatenating the first chainkey with a name of the file; and encrypting the file with the AES-GSM and a second chainkey=HMAC_SHA256 (the encrypted session key, the sender device ID).

11. The non-transitory machine-readable medium of claim 10, comprising instructions for receiving the file at the receiver device, and decrypting the file using the random symmetric session key.

12. The non-transitory machine-readable medium of claim 11, wherein the random symmetric session key is calculated as follows:

random symmetric session key=the encrypted session key−(the random value*the first public key*the public ephemeral key+the random value*the second public key*the third private key)/(mod(the range)).

13. The non-transitory machine-readable medium of claim 10, wherein the encrypted session key is calculated as follows:

the encrypted session key=(the random symmetric session key+the random value*the first public key*the first private key+the random value*the second public key*the third public key)/(mod (the range)).

14. The non-transitory machine-readable medium of claim 13, comprising instructions for storing metadata from the file in a signed Merkle Tree structure.

15. The non-transitory machine-readable medium of claim 10, wherein the random symmetric session key comprises an Advanced Encryption Standard (AES) key comprising 256 bits.

16. The non-transitory machine-readable medium of claim 10, wherein the process comprises a plurality of sending devices, and a different private ephemeral key is selected for each sending device; and wherein the process comprises a plurality of receiver devices, and a different public ephemeral key is selected for each receiver device.

17. A system comprising:
a computer processor; and
a computer memory coupled to the computer processor;
wherein the computer processor and the computer memory are operable for:
generating a random symmetric session key for the sender device;
randomly selecting a private ephemeral key for the sender device, the private ephemeral key associated with a corresponding first public key;
wherein the receiver device comprises a randomly selected public ephemeral key, the public ephemeral key associated with a corresponding first private key;
generating a random value within a range;
calculating an encrypted session key;
encrypting the file using symmetric encryption; and
transmitting from the sender device to the receiver device a group ID, the encrypted session key, the random value, a sender device ID, a receiver device ID, a hashed file ID, a sender key ID, and a receiver key ID, wherein the receiver device includes a record comprising the random value, the sender device ID, the hashed file ID, and the group ID;
wherein the sender device comprises a first public X509 certificate comprising a second public key and a corresponding second private key that is signed by a service provider;
wherein the receiver device comprises a second public X509 certificate comprising a third public key and a corresponding third private key; and
wherein the random symmetric session key and the private ephemeral key are selected from a pool of keys, the random symmetric session key and the private ephemeral key are removed from further usage after being selected, and wherein the pool of keys is replenished after all random symmetric session keys and all private ephemeral keys are selected.

* * * * *